July 8, 1941.    C. H. BISSELL    2,248,330
SUPPORTING BRACKET FOR CONDUIT OUTLET BOXES AND FIXTURES
Filed Oct. 4, 1939    2 Sheets-Sheet 1
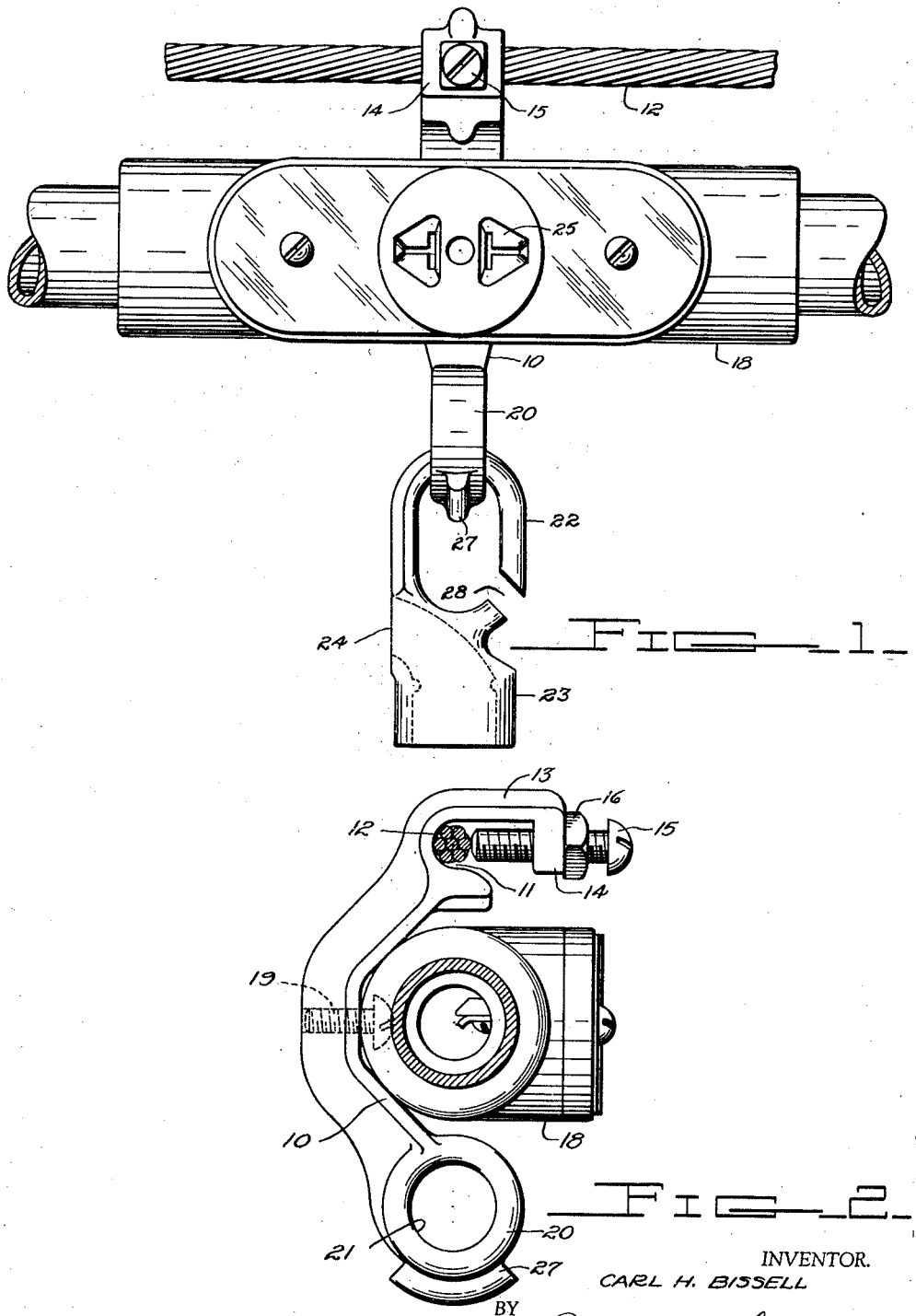
INVENTOR.
CARL H. BISSELL
BY
Bodell & Thompson
ATTORNEYS.

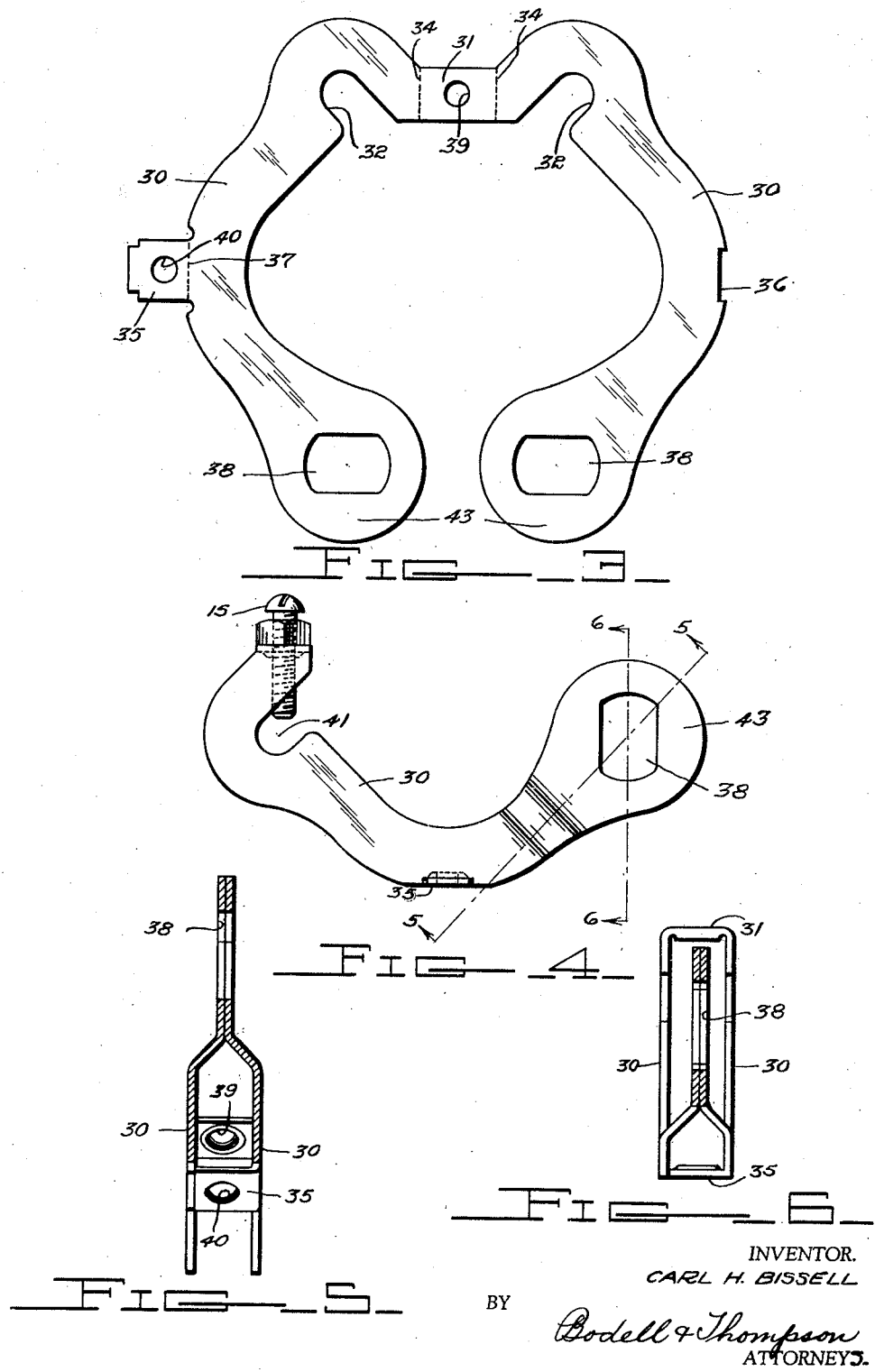

Patented July 8, 1941

2,248,330

UNITED STATES PATENT OFFICE 2,248,330

SUPPORTING BRACKET FOR CONDUIT OUTLET BOXES AND FIXTURES

Carl H. Bissell, Syracuse, N. Y., assignor to Crouse-Hinds Company, Syracuse, N. Y., a corporation of New York Application October 4, 1939, Serial No. 297,959

5 Claims. (Cl. 248—61)

This invention relates to a bracket or supporting member for supporting a conduit outlet box and a fixture from a messenger cable. In many instances there is no part of the building structure available on which to mount or secure an electrical conduit system. In such instances, it is customary to run a supporting or messenger cable at the desired location and suspend the conduit system from the cable.

The general object of this invention is a bracket for attaching the conduit system to the messenger cable, and more particularly the invention has as an object a bracket of the type referred to embodying a particularly simple and economical structure permitting the bracket to be first adequately secured to the condulet outlet boxes in the line and subsequently be fixedly secured to the messenger cable.

The invention as a whole further includes the provision of means for supporting a fixture, permitting the fixture to be conveniently mounted on the bracket and involving a structure which will prevent accidental disengagement of the fixture from the bracket.

The invention further includes a particularly economical and rigid bracket structure formed from a blank of sheet metal material.

The invention consists in the novel features and in the combinations and constructions hereinafter set forth and claimed.

In describing this invention, reference is had to the accompanying drawings in which like characters designate corresponding parts in all the views.

Figure 1 is a front elevational view of a bracket secured to the messenger cable and illustrating a conduit outlet box mounted upon the bracket and a fixture support detachably carried by the bracket.

Figure 2 is a side elevational view of the bracket shown in Figure 1 and of the conduit outlet box.

Figure 3 is a top plan view of a sheet metal blank which may be employed to form a supporting bracket.

Figure 4 is a side elevational view of a bracket formed from the blank shown in Figure 3.

Figure 5 is a view taken substantially on lines 5—5, Figure 4.

Figure 6 is a view taken on lines 6—6, Figure 4.

The bracket disclosed in Figures 1 and 2 is formed of cast metal. Preferably however, the bracket is formed of sheet metal, as disclosed in Figures 3 to 6 of the drawings.

The bracket consists of a substantially C shaped member 10 formed at its upper end with a notch 11 to receive the messenger cable 12. The upper end of the bracket is also formed with a forwardly extending arm 13 having a depending flange 14 threaded to receive a screw 15 which is operable to engage and maintain the cable 12 in the notch 11. A lock nut 16 is provided to prevent loosening of the screw.

The conduit outlet box 18 is arranged in the curvature of the C shaped member 10 and may be secured thereto by a screw 19 extending through the bottom wall of the box and threading into an aperture formed in the bracket intermediate the ends thereof. The lower end of the bracket is formed with a loop portion 20 forming an aperture 21 to receive the hook 22 of a fixture supporting member 23, the lower end of which is threaded for attachment to the fixture, the lead wires being brought out through an opening 24 and may be provided with an attachment plug to be inserted in the receptacle 25 arranged in the cover of the outlet box 18.

The lower portion of the loop 20 is provided with a circumferentially extending bead 27, or is otherwise thickened in cross section to a dimension greater than the opening 28 in the hook portion 22 of the support 23. In order to pass the hook portion 22 through the aperture 21, it is necessary to swing the fixture support 23 to a horizontal position whereby the opening 28 of the hook may be passed over the upper portion of the loop. When the fixture support 23 is hanging in normal vertical position, as indicated in Figure 1, it is impossible to effect disengagement of the fixture support from the loop.

The conduit run may be completely formed on the floor of the building with the brackets 10 secured to the conduit outlet boxes. Thereafter, the conduit run is raised and the arm 13 hooked over the previously installed messenger cable. Subsequently, the screws 15 may be tightened to prevent axial movement of the conduit system along the messenger cable.

As previously alluded to, the bracket 10 may be formed from a sheet metal blank, as shown in Figure 3. This blank consists of a pair of complemental side members 30 also of general C formation, the upper ends being joined by a connecting portion 31. Each of the side members 30 is formed with a slot 32 extending outwardly from the inner edge of the member and adjacent the top end thereof. The bracket is formed by bending the blank on the dotted lines 34, whereby the sides 30 assume a spaced apart parallel relationship, and one of the side members is provided with a radially extending tab 35, and the outer edge of the opposite side member is provided with a notch 36. When the blank is bent to arrange the side members in parallel relationship, the tab 35 is bent rearwardly on dotted line 37 and the free end of the tab is arranged in the recess 36. In this manner, the side members 30 are maintained in spaced apart relationship by the upper connecting portion 31 and the intermediate connecting portion 35. The lower ends of the side members are provided with apertures 38 and preferably, the lower portion of each side member is bent inwardly so that they converge and join and are preferably secured together as by spot welding, see Figures 5 and 6. The upper connecting portion 31 is provided with a threaded aperture 39 and the intermediate tab 35 formed with a threaded aperture 40. When the blank is formed up, the slots 32 form a cable receiving notch 41 and the cable is maintained in the notch by the screw 15. The conduit outlet box is secured to the bracket in the same manner as in Figures 1 and 2, the mounting screw 19 threading into the intermediate connecting portion 35.

The aperture 38 is formed so as to provide a thickened portion 43 at the lower end of the bracket in order to prevent unintentional disengagement of the fixture support 23 after the manner referred to in connection with the description of the bracket shown in Figures 1 and 2.

The bracket, formed in accordance with my invention, provides a convenient means for attaching the conduit system to the messenger cable and for supporting a fixture and when of sheet metal formation, in accordance with Figures 3 to 6, the bracket is exceptionally economical to manufacture and is exceptionally durable in use.

What I claim is:

1. A bracket for supporting a conduit outlet box and fixture from a messenger cable comprising a C shaped member formed at one end with a cable receiving notch and at its opposite end with a loop, means for securing a conduit outlet box to said member intermediate its ends thereof with the axis of the body extending at right angles to said member, means carried by said member and operable to detachably secure the cable in said notch, and a fixture support having a hook portion arranged in said loop, said loop and hook portion being cooperable to prevent disengagement of the hook from the loop when the fixture support is in fixture supporting position.

2. A bracket for supporting a conduit outlet box and fixture from a messenger cable comprising a C shaped member formed at one end with a cable receiving notch and at its opposite end with a loop, means for securing a conduit outlet box to said member intermediate its ends thereof with the axis of the box extending at right angles to said member, means carried by said member and operable to detachably secure the cable in said notch, and a fixture support having a hook portion arranged in said loop, the lower portion of said loop being formed of greater cross section than the opening in said hook.

3. A bracket for supporting a conduit outlet box and fixture from a messenger cable comprising a substantially C shaped member formed at its upper end with a cable receiving notch and having a loop at its lower end and being provided intermediate its ends with an aperture to receive a conduit outlet box supporting screw, the upper end of said member being provided with an outwardly extending portion, a screw threaded in said portion and operable to maintain the cable in said notch, a fixture supporting member having a hook portion arranged in said loop, the lower portion of said loop being of greater cross section than the opening in said hook, whereby said hook can not be disengaged from the loop when the fixture support is in vertical position.

4. A bracket for supporting a conduit outlet box and a fixture from a messenger cable comprising a supporting member of substantially C formation and being formed from a blank of sheet metal and including a pair of complemental side members, an upper connecting portion extending between the upper ends of said side members, an intermediate connecting portion extending between said side members intermediate the ends thereof, said connecting portions maintaining said side members in spaced apart relation, each side member being formed with a cable receiving notch at the upper end thereof, the lower ends of said side members being arranged to receive a fixture supporting hook, said intermediate connecting portion being formed with an aperture to receive a conduit outlet box mounting member and a screw threading through said upper connecting portion and operable to maintain the cable in said notches.

5. A bracket for supporting a conduit outlet box and fixture from a messenger cable comprising a supporting member formed from a blank of sheet metal and including a pair of complemental side members, an upper connecting portion extending between the upper ends of the side members and an intermediate connecting portion extending between said side members intermediate the ends thereof, said connecting portions maintaining said side members in spaced apart relation, and the lower portion of each of said side members converging toward the other and being secured thereto and being formed with a fixture hook receiving aperture, a cable receiving notch formed at the upper end of each side member, said intermediate connecting portion being provided with an aperture to receive a conduit outlet box mounting member, and a screw threading through said upper connecting portion and operable to maintain the cable in said notches.

CARL H. BISSELL.